Aug. 25, 1953     O. R. KUSTER ET AL     2,649,816
TRANSMISSION AND REACTION TORQUE DEVICE
Filed March 31, 1949                 4 Sheets-Sheet 4
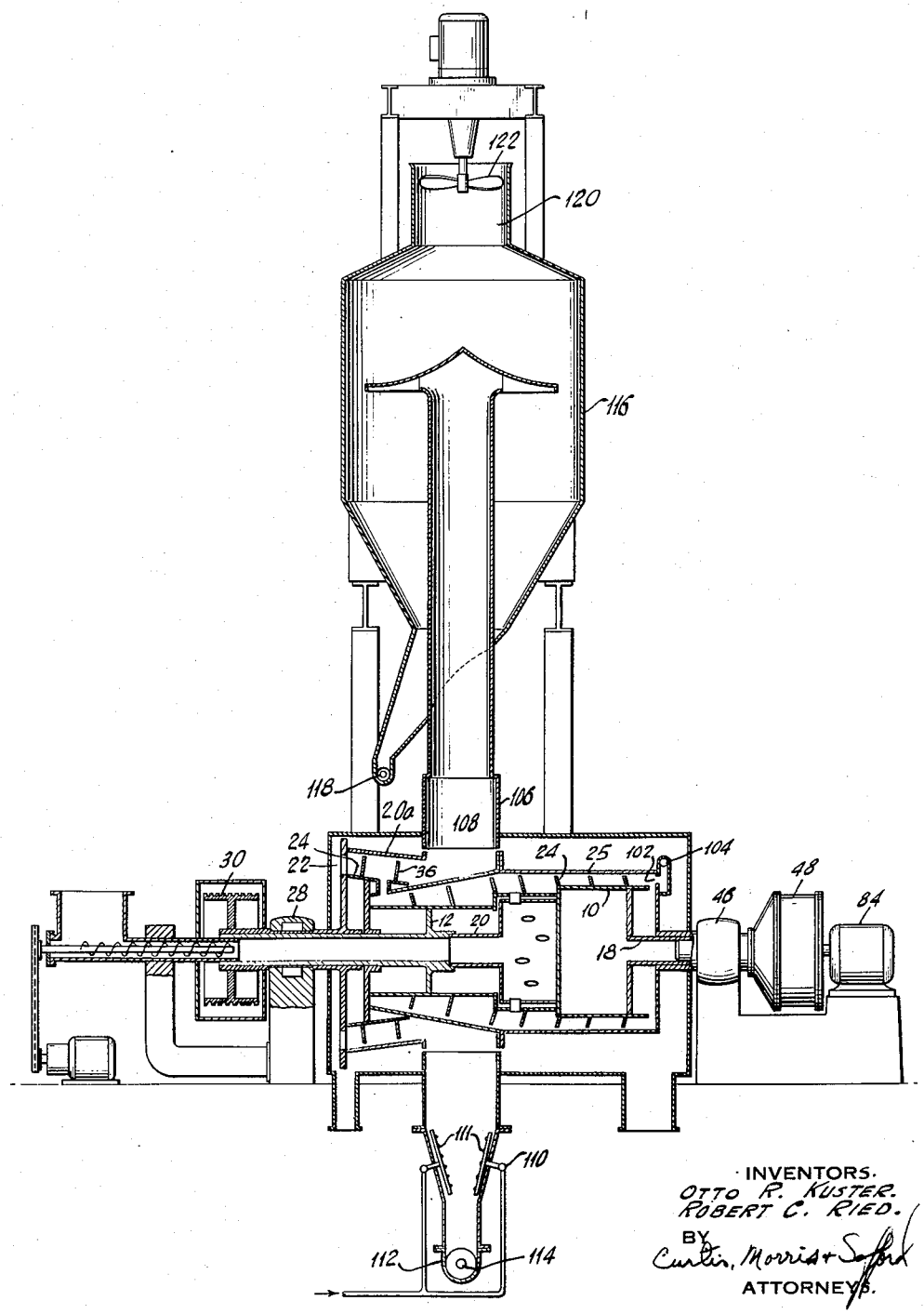
INVENTORS.
OTTO R. KUSTER.
ROBERT C. RIED.
BY
ATTORNEYS.

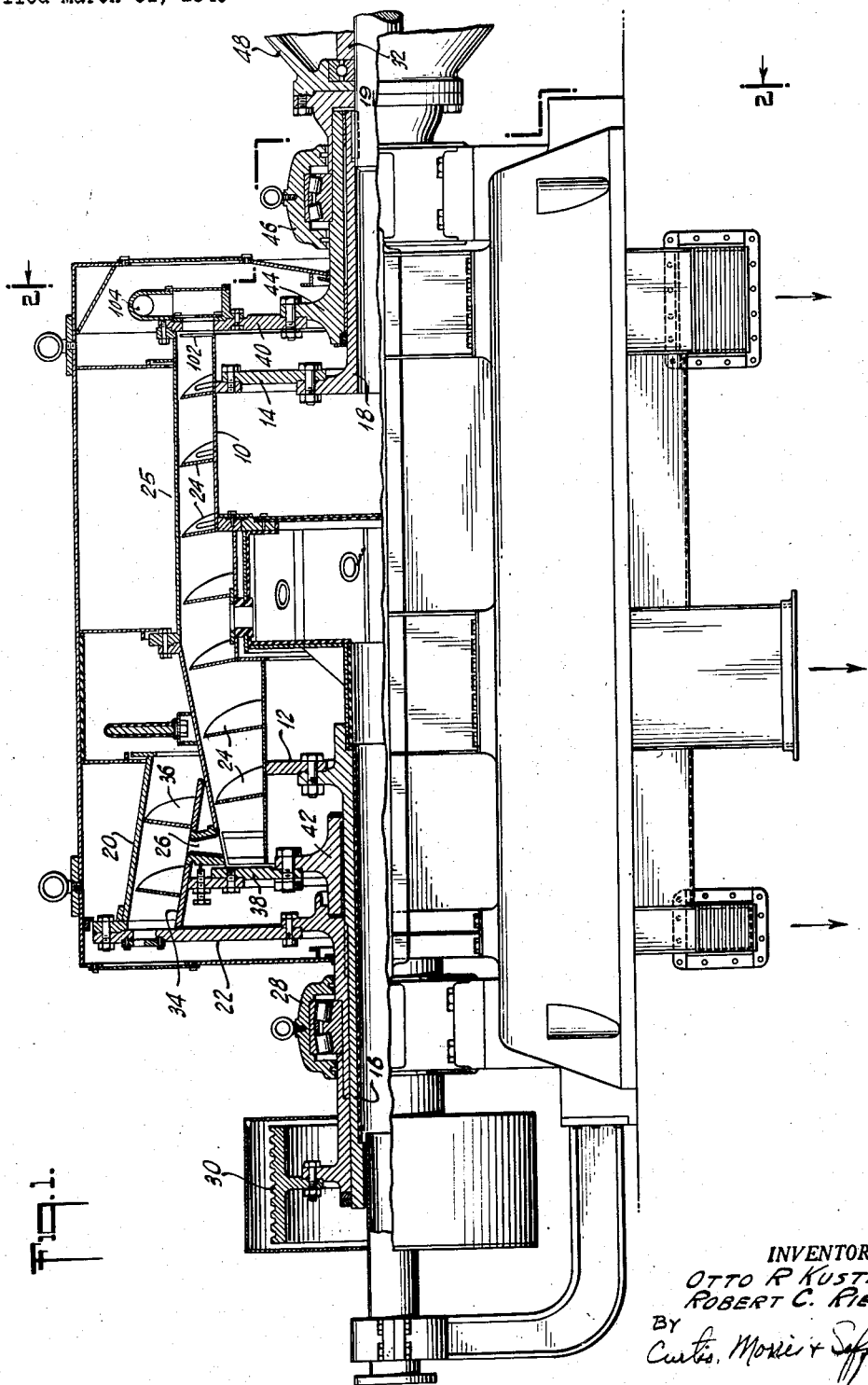

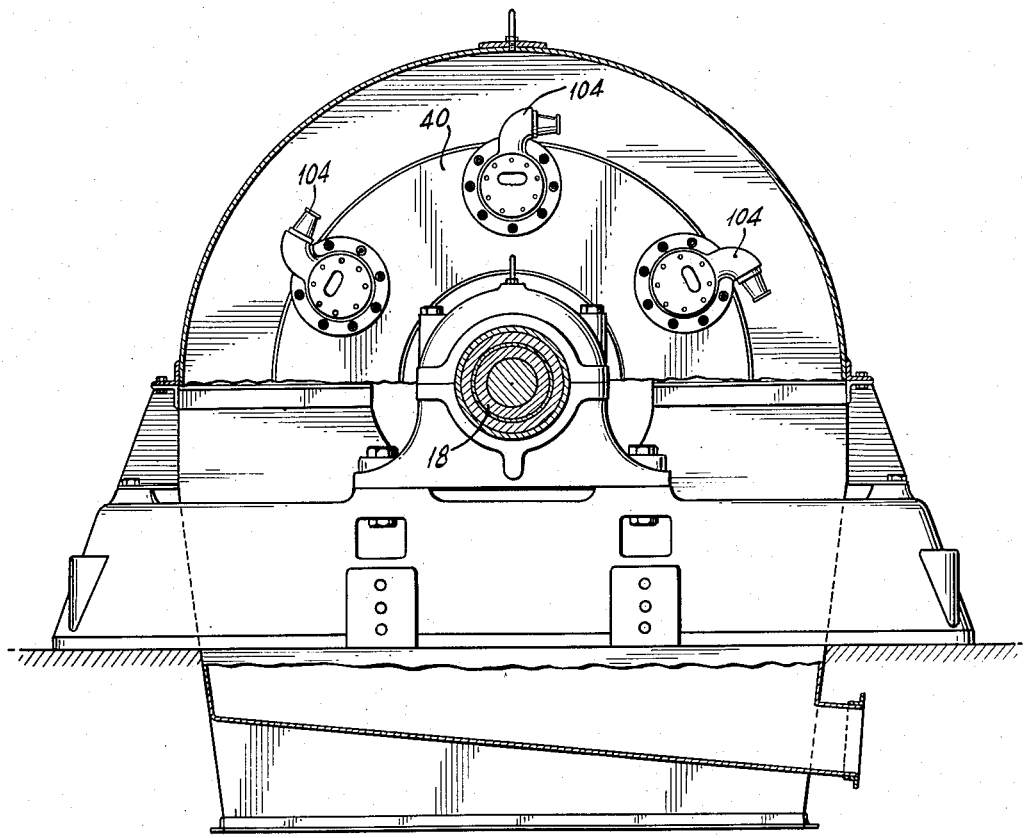

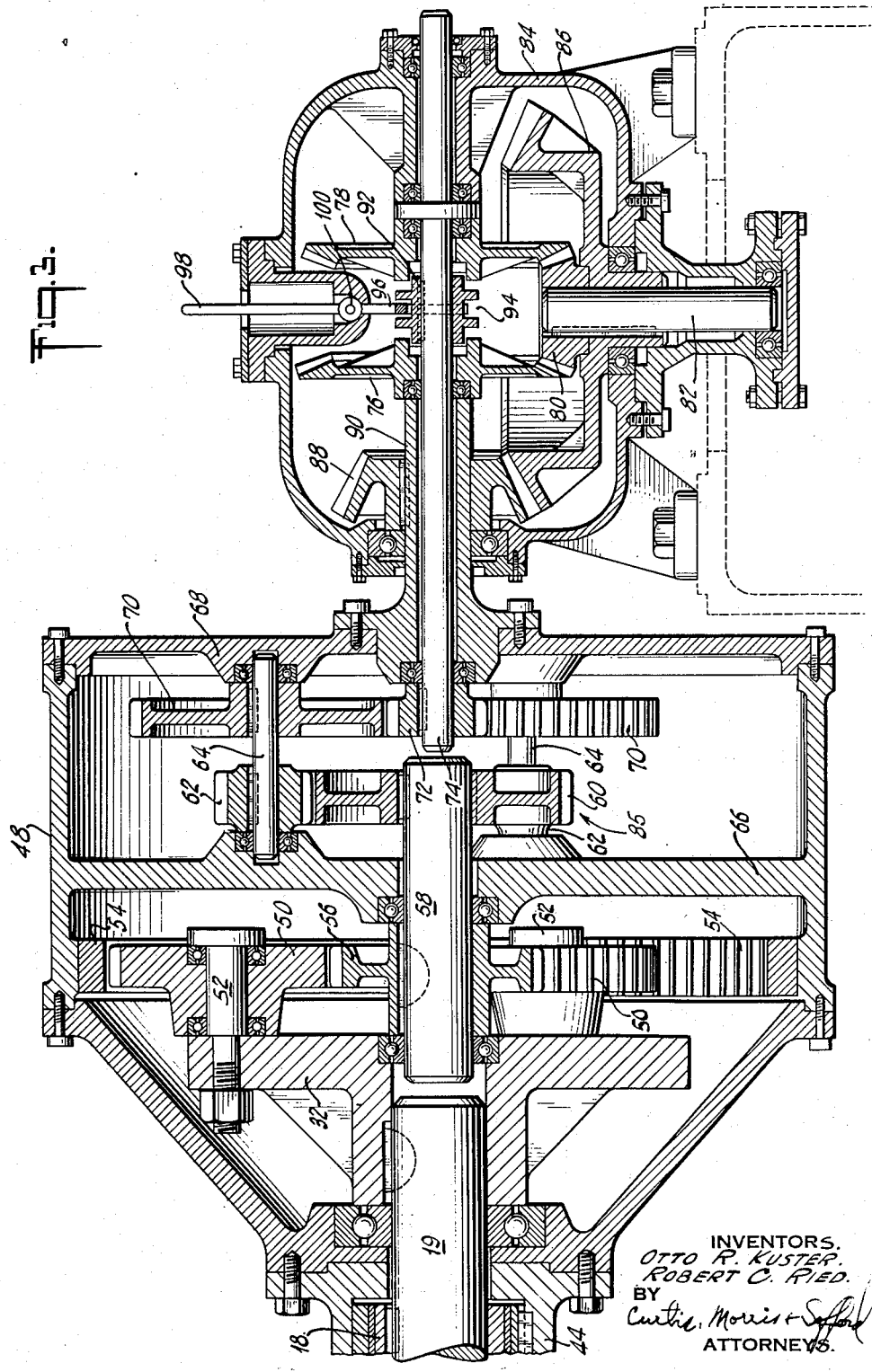

Patented Aug. 25, 1953

2,649,816

UNITED STATES PATENT OFFICE 2,649,816

TRANSMISSION AND REACTION TORQUE DEVICE

Otto Richard Kuster, Brooklyn, and Robert C. Ried, Carle Place, N. Y., assignors to Knowles Associates, New York, N. Y., a partnership Application March 31, 1949, Serial No. 84,516

1 Claim. (Cl. 74—705)

This invention relates to centrifugal separators and to differential speed drives for machines which operate at high speeds with a low speed differential between parts which react on one another. This problem is of particular importance in heavy duty centrifugal machines such as are employed for effecting the continuous separation of the heavier constituents of a liquid suspension from the lighter constituents thereof and is herein shown as embodied in a centrifuge of the solid bowl type, although many of the features of the invention are applicable to other types of machines.

It had been recognized for many years prior to our present invention that a simple direct drive for a part operating with a speed differential from the main rotating machine is not feasible because the reaction of the parts on one another which, even though slight in itself, creates an excessive power demand when it is transmitted back to the power source at the high speed of rotation. Theoretically, this power need not be lost but can be recycled into the main drive, but practically the result is to impose such high horsepower loads on the transmission mechanism as to require excessively heavy apparatus and to produce power losses due to friction which may be even greater than the total useful power load. Thus, for example, if the driving motor drives two gears of slightly different diameter, one connected to a centrifuge bowl for operation at 1000 R. P. M. and the other to a scraper for removing solids from the bowl, operating 5 R. P. M. faster, the power actually required to operate the scraper at lower R. P. M. relative to the bowl may be of the order of five horsepower which at 5 R. P. M. would be a torque of 5250 ft. lbs.

$$\left(T = \frac{HP \times 5250}{R.P.M.}\right)$$

Since, however, it is necessary to apply this torque to a drive shaft which moves with the full speed of the centrifuge (assumed in the simple example to be 1000 R. P. M.) plus (or minus) the differential speed, the power required on the drive shaft is not 5 H. P. but that equivalent to the horsepower developed by the torque of 5250 ft. lbs. at 1005 R. P. M. which is 1005 H. P.

$$\left(HP = \frac{T \times R.P.M.}{5250}\right)$$

The difference, 1000 hosepower, is applied to the main drive shaft through the transmission gearing in opposition to the same horsepower transmitted back along it as the reaction. Although these high "circulating horsepowers" are thus balanced out, they do nevertheless figure in the efficiency of the apparatus, so that a low percentage efficiency loss becomes a high actual power loss. Moreover, all transmission parts must be made heavy and expensive because of the need for carrying the high "circulating power" load.

It is an object of the present invention to provide an improved apparatus which can give such a dual speed drive with greater economy and reliability.

More particularly it is an object of the invention to provide an efficient and economical and reliable centrifugal separator.

The problems attacked by the invention have been particularly significant in centrifuges used for effecting the separation of the water from the fine coal and coal fines, which are end products of the hydraulic beneficiation treatment of coal. The invention will therefore be described herein with reference to such application.

With the foregoing and other objects in view the invention aims to provide a drive for rotating machinery and especially for centrifuges in which parts are driven at high speed and at the same time operated, against substantial resistance, at a slow relative speed between them.

Another important feature of the invention is the provision, in the differential drive mechanism by which one rotor is driven at a different speed relative to another rotor (e. g. a screw in a centrifuge to produce the conveying action lengthwise of the bowl), of means whereby the difference in speed may be easily and quickly adjusted, e. g. to suit different materials to be treated.

In existing machines the relative speeds of the rotors could usually be changed only by replacing the differential gear unit by another with another gear ratio. In the novel centrifuge of the present invention a stationary gear shift unit permits the speed change to be made easily and directly and with no substantial loss in production by the machine.

Still another important feature of the invention is the use of reaction means at the primary effluent discharge for recovering some of the power employed in bringing the effluent to the point of discharge.

Another feature is the utilization of kinetic energy of the separated solids to break them up into small pieces—which is referred to herein as "atomizing"—and distribute them in a drying atmosphere in a spray dry tower or chamber.

Other objects, important features and advantages of the invention, to which specific reference has not hereinabove been made, will appear hereinafter when the following description and claim are considered in connection with the accompanying drawings, in which—

Figure 1 is a side view partly in longitudinal vertical section and partly in elevation of a centrifuge embodying the present invention;

Figure 2 is a section on the line 2—2 of Figure 1;

Figure 3 is an enlarged longitudinal vertical section through the gear reduction and speed changing mechanism; and Figure 4 is a diagrammatic sectional view showing the apparatus of Figures 1 and 2 combined with a spray drying tower for drying the cake as it discharged from the secondary centrifuge.

In the illustrative embodiment of the invention a two-stage solid bowl centrifuge machine is shown as comprising a low speed rotor and a high speed rotor revolving at different speeds about the same axis. The low speed rotor herein shown comprises a core 10 connected by end heads 12 and 14 to the shafts 16 and 18 which support the low speed rotor and an outer, secondary centrifuge bowl 20-A connected to shaft 16 by the end head 22. A scroll 24 on the core 10 serves as a screw conveyor to move the concentrated solids along the primary centrifuge bowl 25 toward discharge outlets 26.

The driving or power input shaft 16 is hollow and is mounted in a self-aligning roller bearing 28. This shaft is driven from any suitable source of power through a multiple V-belt pulley 30 connected thereto. The low speed power output shaft 18 is keyed and/or splined through the shaft 19 to the flange or spider 32 of a differential gear reducer, hereinafter more fully to be described.

The high speed rotor, which revolves at a few revolutions per minute more than the low speed rotor, draws its driving force from the low speed rotor through the differential gearing of the present invention, as more fully set forth hereinafter. Like the low speed rotor, it comprises a core 34 carrying a screw conveyor scroll 36 for the outer, secondary centrifuge, and a bowl 25, for the primary centrifuge, these two portions of the high speed rotor being connected together and carried by end plates 38 and 40 which are carried, respectively, by the bearing 42 on the hollow drive or power input shaft 16 and by the hollow high speed drive shaft 44 supported in the roller bearing 46. At its outer end the shaft 44 is connected to and turns with the differential gear housing 48.

The two-stage centrifuge machine shown and thus broadly described is more particularly described and claimed in a copending application of R. C. Ried aand C. L. Knowles, filed March 31, 1949, under Serial No. 84,638.

The connection between the low speed rotor 10 and the high speed rotor 25, by which the high speed rotor is driven from the low speed rotor at a differential speed, will now be described.

Reduction gearing is contained in a rotating housing 48 which is connected to the high speed shaft 44 of the centrifugal apparatus and serves as one element of a differential (in this case a planetary gear system) 50, 54, 56. The low speed shaft 18 of the centrifugal apparatus is connected to the intermediate element 50 of the differential gear system; and the third element of the differential system is connected through the gear system 60, 62, 70, 72 to the control shaft 74, which is driven clockwise or counter-clockwise from the first element of the differential through the housing 48 and the gear system contained in the housing 84. As will presently appear, the drive ratio between the bowl 25 and scraper 24 is predetermined, in the example illustrated, by connecting the bowl 25 to the annular gear 54 of the differential and the scraper 24 to the spider 32, which carried the planet gears, and then connecting the sun gear to the annular gear through a gear train. However, any one of the three elements could be connected to the bowl and any of the remaining two connected to the scraper, whereupon the third would become the reaction element to be connected either to the bowl or the scraper through a gear train or other torque converter, which may be of fixed ratio or, as will appear below, is advantageously of the variable ratio type.

As above pointed out, the low speed rotor, which is driven from any suitable source of power through the belt pulley 30, has a power take-off shaft 19 connected to flange 32 at the right in Figure 1 which serves as the spider of the differential-gear reducer shown in enlarged detail in Figure 2. The spider 32 carries three planetary gears 50 mounted on stub shafts 52 bolted to the spider 32. These planetary gears 50 rotate the housing 48 of the differential gear by meshing with the internal annular gear 54 which is firmly attached to the inner wall of the housing 48. The center pinion or "sun gear" 56 is driven from the planetary gears 50 and is keyed to a shaft 58 having keyed to its other end a spur gear 60 at the center of a second reduction stage 85, including also the pinions 62 each keyed to a shaft 64 rotatably mounted in the transverse partition 66 and the end wall 68, respectively, of rotating housing 48, with which the pinions 62 revolve in an annular path about the axis of gear 60. Each shaft 64 carries a second gear 70 keyed through it to one of the pinions 62; and these in turn mesh with and revolve about the central pinion 72 keyed to shaft 74, thus completing the power transmitting gear train from the shaft 18 to the shaft 74. It will be evident that the speed ratio established between the gears 60 and 72 depend not only on the gear ratios (i. e. the number of teeth on the respective gears) but also on the rotation of the housing 48 relative to shafts 58 and 74, respectively.

In the reduction gearing of existing centrifuges and the like, the reaction end of the differential gear is held stationary by clamping it to a bracket attached to the base or it is driven by a separate motor. In the improved transmission of the present invention, on the contrary, the reaction is taken through a reduction gear back to one of the power shafts 18 and 44, e. g., through the housing 48 to the power output shaft 44. In the example shown, the shaft 74 rotates at one-fifth the speed of rotation of the shaft 18, in either a clockwise or a counter-clockwise direction, thus adding to, or subtracting from, the speed transmitted from shaft 74 to the rotary housing 48.

In the illustrative embodiment of the invention, two bevel gears 76 and 78 are mounted on the shaft 74 to rotate freely thereon, except when connected thereto as hereinafter described. Each of these bevel gears 76 and 78 meshes with the bevel pinion 80 which is keyed to a vertical shaft 82 mounted to turn in bearings in the base of the housing 84. Also keyed to the vertical shaft 82 is a bevel gear 86 which engages a bevel pinion 88. The bevel pinion 88 is keyed to a hollow shaft 90 concentric with the shaft 74, the hollow shaft 90 being flanged at its end outside the casing 84 and the flange bolted to the end wall 68 of the housing 48.

The speed change is effected by means of a dog clutch sleeve 92 keyed to the shaft 74 between the gears 76 and 78 but is longitudinally slidable thereon and is provided with an annular groove 94 into which projects a yoke 96 of a clutch pivotally mounted on shift lever 98 fulcrumed at 100 on the housing 84. By moving the clutch shift lever 98 in a clockwise direction in Figure 3, the clutch sleeve 92 will be moved to the left to cause its teeth to enter corresponding recesses in the hub of the bevel gear 76, thus locking this gear to the shaft 74 and causing the hollow shaft 90 to be turned in the same direction relative to shaft 74, through the bevel pinion 80, the bevel gear 86 and the bevel pinion 88. In a similar manner movement of the clutch lever 98 in a counterclockwise direction will cause the corresponding teeth on the other end of the clutch sleeve 92 to enter the corresponding recesses in the hub of the bevel gear 78 and thereby, through the connections above described, effect the rotation of the hollow shaft 90 in the opposite direction, relative to shaft 74. It will be understood, however, that this reversal will not ordinarily produce a change in the absolute direction of rotation of shaft 90 and housing 48, but merely reverses the direction of rotation of shaft 74, thereby adding or subtracting an increment of rotational speed in the planetary system 56, 50, 54.

Illustrative speeds and gear ratios are here given to show the effect of the operation of the gear reducing and gear shifting mechanisms hereinabove described. The shaft 18, which is connected to the low speed rotor 10, is driven at a speed of 600 R. P. M. The gear ratios are as follows:

Spur gears 72 and 70, ratio 3:1
Spur gears 62 and 60, ratio 3:1
Planetary gears 56, 50 and 54, ratio 4.44:1
Overall ratio=(3×3×4.44):1=40:1

With the low speed rotor driven at 600 R. P. M. from a 250 H. P. motor, it is estimated that the power to be transmited by this differential gear set will be about 125 H. P.

In the bevel gear reducer, the gears 76 and 80, or 78 and 80, have a gear ratio of 2.5:1; gears 86 and 88 a gear ratio of 2.06:1; overall ratio—(2.5×2.06):1=5.15:1.

If the shaft 74 be so geared through the gearing in the housing 84 that it is driven at a speed of approximately 120 R. P. M. in a direction opposite to the direction of rotation of the centrifuge, we then have a differential speed between the high speed rotor 25 and the low speed rotor 10, computed as follows:

Adding the 120 R. P. M. to 600 R. P. M. and divide by the gear ratio in the gear housing 48, as follows:

$$\frac{600 \text{ R. P. M.} + 120 \text{ R. P. M.}}{40} = 18 \text{ R. P. M.}$$

which is the differential speed between the high and low speed rotors of the centrifuge. If the shaft 74 rotates in the same direction as the shaft 18 the equation will then be $$\frac{600 \text{ R. P. M.} - 120 \text{ R. P. M.}}{40} = 12 \text{ R. P. M.}$$

Thus, by shifting the lever 98 the differential speed between the low speed rotor and the high speed rotor may be changed from the 12 R. P. M. differential to the 18 R. P. M. differential and vice versa, i. e., from 612 to 618 R. P. M. on the high speed rotor and its drive connection.

In the primary stage the bowl proper, that is the part in which the pool is carried under centrifugal action, namely the rotor 25, will be rotated at 12 or 18 R. P. M. faster than the low speed rotor 10. In the secondary stage, however, the bowl proper, that is the part 20, since it is connected to the low speed rotor 10 will be rotated at 12 or 18 R. P. M. less than the scroll carrying part 34 which is connected to the high speed rotor 25. Because, however, of the considerably increased diameter of the secondary bowl 20, the gravity action of this bowl, by reason of the greater peripheral speed, will be considerably higher than the gravity action of the bowl 25.

As shown more particularly in Figures 1 and 2 of the drawings, the discharge openings 102 in the end plate of the high speed rotor 25 of the primary centrifuge may be provided with discharge nozzles or jets 102 so arranged tangentially to their path of rotation about the axis of the rotor that the discharge of the effluent from the centrifuging operation is in a direction opposite to the direction of rotation of the rotor, thereby serving as reaction jets to apply some of the energy of the rapidly rotating liquid for driving the rotor.

In Figure 4 is shown diagrammatically an arrangement for delivering a dry granular or powdery product. In this case the centrifuge (e. g., one as shown in Figures 1 and 2) is surrounded at its solids discharge end with a drying chamber 106 into which the discharged solids are thrown by centrifugal force. Advantageously the solids discharge edge 108 of the secondary bowl 20a is serrated, corrugated or castellated or otherwise designed to break up the cake of concentrated solids into relatively small pieces so as to give high proportion of surface area exposed to the atmosphere of the drying chamber. A drying gas such as heated air, for example, or furnace gases, is blown in from pipes 110 and nozzles 111 into the bottom of the spray drying tower or the discharge housing may be heated by gas burners 111. This passes up around the discharging bowl 20a with a velocity sufficient to delay substantially the fall of the pieces of solids thrown off from the edge 108. Coarser particles will fall countercurrent through the flow of drying gas into the channel 112 where it is carried off by the screw conveyor 114. Lighter particles may be carried up through the tower into the settling chamber 116 from which they settle into the channel 118 and are conveyed to a suitable discharge. The used gas passes off at the top 120 and may be drawn off by fan 122.

We claim:

A dual-speed drive for maintaining two operating parts respectively at different high rotational speeds against a reaction torque between them, one of said operating parts being independently driven and the other of said operating parts being driven by said one part through said dual-speed drive, said dual-speed drive comprising a planetary gear system including sun, planetary and annular gears and in which the annular gear is connected to the higher speed operating part, the planetary gear is connected to the lower speed operating part and a mechanical connection interconnects said sun gear and annular gear independently of said planetary system, said mechanical connection including a gear train having a reversing mechanism and a manually operated member for actuating said reversing mechanism to reverse the direction of the torque transmitted by said gear train.

OTTO RICHARD KUSTER.
        ROBERT C. RIED.

References Cited in the file of this patent

UNITED STATES PATENTS

| Number | Name | Date |
|---|---|---|
| 1,227,456 | Lafitte | May 22, 1917 |
| 1,611,989 | Behr | Dec. 28, 1926 |
| 1,655,426 | Laughlin | Jan. 10, 1928 |
| 1,802,112 | Henderson et al. | Apr. 21, 1931 |
| 1,803,744 | Abbona | May 5, 1931 |
| 1,882,390 | MacIsaac | Oct. 11, 1932 |
| 1,933,644 | Trump | Nov. 7, 1933 |
| 1,936,866 | Van Ackeren | Nov. 28, 1933 |
| 2,156,372 | Campbell | May 2, 1939 |
| 2,184,598 | Jahn | Dec. 26, 1939 |
| 2,200,566 | Szekely | May 14, 1940 |
| 2,364,448 | Jandasek | Dec. 5, 1944 |
| 2,433,864 | Pattee | Jan. 6, 1948 |
| 2,458,706 | Howe | Jan. 11, 1949 |
| 2,514,158 | Hussain | July 4, 1950 |
| 2,525,822 | Mount | Oct. 17, 1950 |

FOREIGN PATENTS

| Number | Country | Date |
|---|---|---|
| 876,531 | France | Nov. 9, 1942 |
| 932,655 | France | Mar. 30, 1948 |